United States Patent
Smith et al.

(10) Patent No.: US 8,554,150 B2
(45) Date of Patent: Oct. 8, 2013

(54) MULTI-WAN MODULE

(76) Inventors: Thomas Benjamin Smith, Landrum, SC (US); Joseph Pontin, Seneca, SC (US)

( * ) Notice: Subject to any disclaimer, the term of this patent is extended or adjusted under 35 U.S.C. 154(b) by 66 days.

(21) Appl. No.: 13/275,780

(22) Filed: Oct. 18, 2011

(65) Prior Publication Data

US 2013/0095877 A1    Apr. 18, 2013

(51) Int. Cl.
*H04B 17/00* (2006.01)
*H04K 3/00* (2006.01)

(52) U.S. Cl.
USPC .............. 455/67.11; 455/101; 340/870.03; 340/870.11

(58) Field of Classification Search
USPC .............. 455/41.1–41.3, 101–104, 127.4, 455/552.1–553.1, 67.11; 340/870.01–870.03, 870.06, 870.11
See application file for complete search history.

(56) References Cited

U.S. PATENT DOCUMENTS

| | | |
|---|---|---|
| 7,434,076 B1 * | 10/2008 | Altounian et al. ............ 713/324 |
| 7,583,197 B2 | 9/2009 | Wesby Van Swaay |
| 8,094,010 B2 | 1/2012 | Wesby-van Swaay |
| 2004/0120421 A1 | 6/2004 | Filipovic |
| 2007/0149257 A1 | 6/2007 | Cheresh et al. |
| 2009/0028098 A1 | 1/2009 | Gates et al. |
| 2009/0243869 A1 | 10/2009 | Sanderford, Jr. |
| 2010/0278187 A1 | 11/2010 | Hart et al. |
| 2011/0194543 A1 | 8/2011 | Zhao et al. |

OTHER PUBLICATIONS

Oct. 29, 2012 Office Action for Canadian Patent Application No. 2,755,393.
PCT International Search Report for PCT International Application No. PCT/US2011/062791, search completed Feb. 9, 2012; report mailed Feb. 22, 2012.
Written Opinion of the International Searching Authority for PCT International Application No. PCT/US2011/062791, opinion completed Feb. 9, 2012; date of mailing Feb. 22, 2012.
Office Action for Canadian Patent Application No. 2,755,393 dated Mar. 2, 2012.
"Cradlepoint MBR900 Mobile Broadband N Router Reviewed" from www.smallnetbuilder.com/wireless/wireless-reviews/31423-cradlepoint-mbr900-mobile-broadband-n-router-reviewed, Feb. 22, 2011.
Office Action for Canadian Patent Application No. 2,755,393 dated Jul. 16, 2012.

* cited by examiner

*Primary Examiner* — Lee Nguyen
(74) *Attorney, Agent, or Firm* — Lee & Hayes, PLLC

(57) ABSTRACT

Disclosed is a wide area network (WAN) module including plural radios, a power supply, and a switch configured so that one and only one of the radios may receive power at any one time. The switch may be electronically or manually operable; if electronically operable, the module may include a processor and a universal serial bus (USB) port for receiving power switching instructions. The WAN module may be incorporated into utility consumption measuring (metering) devices which may correspond to components in a consumption measurement and reporting automatic meter reading (AMR) system.

16 Claims, 2 Drawing Sheets

MULTI-WAN MODULE

FIELD OF THE SUBJECT MATTER

The presently disclosed subject matter in general relates to communications modules. More specifically, the presently disclosed subject matter relates to multi-wide-area-network (WAN) communications modules such as may be associated with utility consumption reporting metrology devices, which in turn are such as may be associated with a system for transmitting utility consumption data therefrom to another location, such as a central office.

BACKGROUND OF THE SUBJECT MATTER

The general object of metrology is to monitor one or more selected physical phenomena to permit a record of monitored events. Such basic purpose of metrology can be applied to a variety of metering devices used in a number of contexts. One broad area of measurement relates, for example, to utility meters. Such role may also specifically include, in such context, the monitoring of the consumption or production of a variety of forms of energy or other commodities, for example, including but not limited to, electricity, water, gas, or oil.

More particularly concerning electricity meters, mechanical forms of registers have historically been used for outputting accumulated electricity consumption data. Such an approach provided a relatively dependable field device, especially for the basic or relatively lower level task of simply monitoring accumulated kilowatt-hour consumption.

The foregoing basic mechanical form of register was typically limited in its mode of output, so that only a very basic or lower level metrology function was achieved. Subsequently, electronic forms of metrology devices began to be introduced, to permit relatively higher levels of monitoring, involving different forms and modes of data.

In the context specifically of electricity meters, for a variety of management and billing purposes, it became desirable to obtain usage data beyond the basic kilowatt-hour consumption readings available with many electricity meters. For example, additional desired data included rate of electricity consumption, or date and time of consumption (so-called "time of use" data). Solid state devices (for example, provided on printed circuit boards and utilizing programmable integrated circuit components) have provided effective tools for implementing many of such higher level monitoring functions desired in the electricity meter context.

In addition to the beneficial introduction of electronic forms of metrology, a variety of electronic registers have been introduced with certain advantages. Still further, other forms of data output have been introduced and are beneficial for certain applications, including wired transmissions, data output via radio frequency transmission, pulse output of data, and telephone line connection via such as modems or cellular linkups.

The advent of such variety and alternatives has often required utility companies to make choices about which technologies to utilize. Such choices have from time to time been made based on philosophical points and preferences and/or based on practical points such as training and familiarity of field personnel with specific designs.

Electricity meters typically include input circuitry for receiving voltage and current signals/levels at the electrical service. Input circuitry of whatever type or specific design for receiving the electrical service current signals is referred to herein generally as current acquisition circuitry, while input circuitry of whatever type or design for receiving the electrical service voltage signals is referred to herein generally as voltage acquisition circuitry.

Electricity meter input circuitry may be provided with capabilities of monitoring one or more phases of supplied electricity, depending on whether monitoring is to be provided in a single or multiphase environment. Moreover, it is desirable that selectively configurable circuitry may be provided so as to enable the provision of new, alternative, or upgraded services, or processing capabilities within an existing metering device. Such variations in desired monitoring environments or capabilities, however, lead to the requirement that a number of different metrology configurations be devised to accommodate the number of phases required or desired to be monitored or to provide alternative, additional, or upgraded processing capability within a utility meter.

While various aspects and alternative embodiments may be known in the field of utility metering communications, no one design has emerged that generally encompasses the above-referenced characteristics and other desirable features associated with utility metering technology as herein presented.

SUMMARY OF THE SUBJECT MATTER

In view of the recognized features encountered in the prior art and addressed by the presently disclosed subject matter, an improved methodology for providing reliable communications for automated meter reading (AMR) devices over advanced metering infrastructure (AMI) and other wide area network (WAN) environments has been provided. In an exemplary embodiment, the presently disclosed subject matter relates to a WAN module comprising at least two radios where each radio is configured to wirelessly transmit information. The module also includes a power supply and a switch. The switch may be configured to direct operating power from such power supply to a selected one of the at least two radios. In such manner, the switch is configured to supply power to only one of the at least two radios at any one time.

In further embodiments, such an exemplary switch may be an electronically controllable switch and the module may also include a controller configured to electronically control such switch. In selected embodiments, a USB interface may be coupled to the controller so that externally applied commands may be sent to the controller by way of the USB interface to control the switch. In alternative embodiments, such switch may be manually operable.

In certain embodiments, a module in accordance with the presently disclosed subject matter may further include a broadband antenna coupled to an output of each of the at least two radios. In selected embodiments of the presently disclosed subject matter, such at least two radios may be configured to wirelessly transmit information using different frequency bands and/or using different modulation technologies. In certain selected embodiments, such at least two radios may alternatively be identical so that a first of such at least two radios may be configured as a primary radio and a second of such at least two radios may be configured as a failover radio (in other words, a radio for taking the place of the first radio should it fail).

The presently disclosed subject matter may also relate to a utility consumption measuring device including a utility consumption measuring component and a WAN module including at least two radios, a power supply, and a switch. In such embodiments, a switch may be configured to direct operating power from such power supply to a selected one of such at least two radios so that only one of such at least two radios may receive operating power at any one time.

In certain of such foregoing alternative present exemplary embodiments, such a utility consumption measuring device may include a controller, and such a switch may in some embodiments be an electronically controllable switch. In such embodiments, the controller may be configured to selectively operate the switch, and the utility consumption measuring component may be configured to transmit consumption information to the controller for transmission by one of such at least two radios. In selected further alternative embodiments, the device may also include a USB interface coupled to the controller so that external commands may be sent to the controller by way of the USB interface to control the switch.

In certain selected present exemplary embodiments of the foregoing, such a switch may instead (or in addition) be manually operable.

The presently disclosed subject matter also relates to systems for transmitting utility consumption information, such as to a central office. Such systems may include a plurality of utility consumption measuring devices where each utility consumption measuring device includes a utility consumption measuring component and such as a WAN module. In such systems, the WAN module in selected of the plurality of utility consumption measuring devices may include per presently disclosed subject matter at least two radios, a power supply, and a switch, with such switch configured to direct operating power from the power supply to a selected one of the at least two radios so that only one of the at least two radios may receive operating power at any one time. In selected of such systems, a processor and a USB interface may be provided in selected of the WAN modules and with such processor configured to receive signals from the USB interface to control the switch. In certain of such systems, the switch alternatively may be manually operable.

Additional details of the presently disclosed subject matter are set forth in, or will be apparent to, those of ordinary skill in the art from the detailed description herein. Also, modifications and variations to the specifically illustrated, referred, and discussed features and elements hereof may be practiced in various embodiments and uses of the presently disclosed subject matter without departing from the spirit and scope of such subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the presently disclosed subject matter, not necessarily expressed in the summarized section, may include and incorporate various combinations of aspects of features, components, or steps referenced in the summarized embodiments above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the presently disclosed subject matter, including the best mode thereof, directed to one of ordinary skill in the art, is set forth in the specification, which makes reference to the appended figures, in which.

Figure 1:
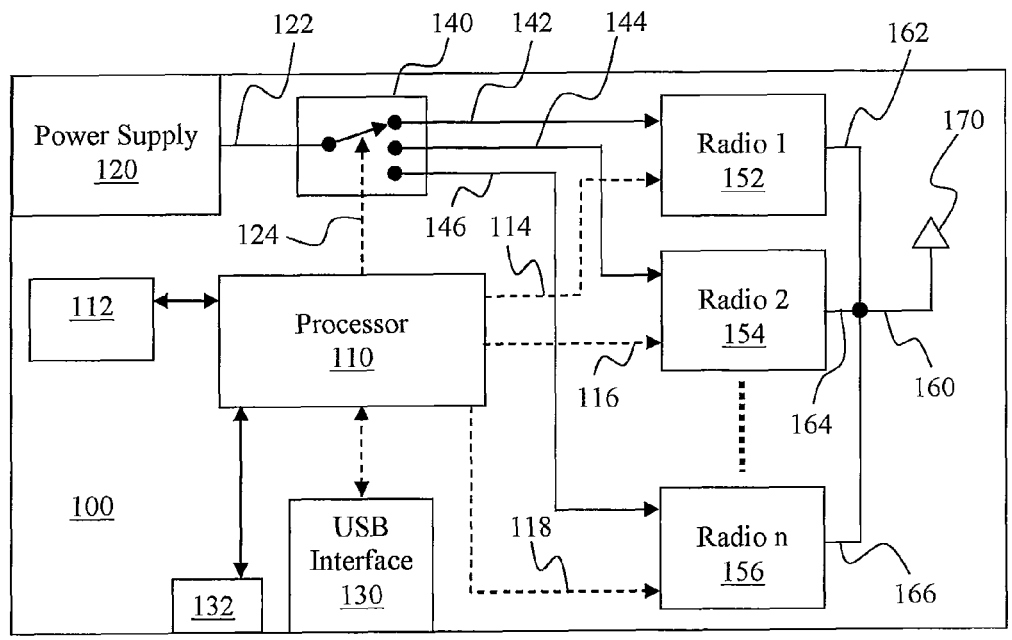
FIG. 1 is a block diagram of a first exemplary embodiment of a WAN module in accordance with presently disclosed subject matter.

Repeat use of reference characters throughout the present specification and appended drawings is intended to represent same or analogous features or elements of the presently disclosed subject matter.

DETAILED DESCRIPTION OF THE SUBJECT MATTER

As discussed in the Summary of the Subject Matter section, the presently disclosed subject matter relates to multi-WAN communications modules that may be associated with utility consumption reporting metrology devices.

A new American National Standards Institute (ANSI) protocol, ANSI C12.22, is being developed that may be used to permit open protocol communications among metrology devices from various manufacturers. C12.22 is an application layer protocol that provides for the transport of C12.19 data tables over any network medium. Currently drafted standards for the C12.22 protocol include: authentication and encryption features; addressing methodology providing unique identifiers for corporate, communication, and end device entities; self describing data models; and message routing over heterogeneous networks.

Much as hypertext-transfer-protocol (HTTP) protocol provides for a common application layer for web browsers, C12.22 provides for a common application layer for metering devices. Benefits of using such a standard include the provision of: a methodology for both session and session-less communications; common data encryption and security; a common addressing mechanism for use over both proprietary and non-proprietary network mediums; interoperability among metering devices within a common communication environment; system integration with third-party devices through common interfaces and gateway abstraction; both 2-way and 1-way communications with end devices; and enhanced security, reliability and speed for transferring meter data over heterogeneous networks.

In addition, the desire for increased mesh network operational capabilities as well as other considerations including, but not limited to, a desire to provide improved capabilities for individual metrology components in an open operational framework, leads to requirements for interfacing such components with mesh network system applications.

As such, it is generally desired to provide improved communications capabilities including improved communications reliability and operational options for advanced metering infrastructure applications in an open operational framework.

Reference will now be made in detail to the presently preferred embodiments of the subject multi-WAN module. Referring now to the drawings, FIG. 1 illustrates a block diagram of a first embodiment of a WAN module generally 100 in accordance with presently disclosed subject matter.

Selected combinations of aspects of the disclosed technology correspond to a plurality of different embodiments of the presently disclosed subject matter. The exemplary embodiments presented and discussed herein should not insinuate limitations of the presently disclosed subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

As may be seen in FIG. 1, WAN module 100 may correspond to a module including a processor 110 configured to control the flow of electrical power from exemplary representative power supply 120 to one of a plurality of representative radio devices 152, 154, 156. Radio devices 152, 154, 156 corresponding to Radio 1, Radio 2, Radio n, are representative of a plurality of radio devices that may be simultaneously installed, i.e., physically present, in WAN module 100 but separately powered. Generally in accordance with presently disclosed subject matter, at least two radios will be provided in any one WAN module 100 provided per present exemplary embodiments. However, any number of radios may be provided as desired or required for particular situations, and all such embodiments are represented by Radio n (156) and are intended as being encompassed by the presently disclosed subject matter.

In an exemplary configuration, processor 110 may correspond to a microprocessor or other suitable device including, without limitation, devices such as Application Specific Integrated Circuit (ASIC) devices.

In operation, WAN module 100 may be associated with a utility metrology device configured to measure utility consumption such as electricity, gas, or water usage. In such an environment, WAN module 100 may be housed together with a utility meter such as positioned under the glass of an electric meter along with additional metrology equipment or may be associated externally with such meter or with other types of utility metrology devices such as gas or water meters.

Further, in general, WAN module 100 may receive an input signal via USB interface 130 or some other input connection including, for example, connector 132 from a metrology device, for example, a consumption measurement device (not separately illustrated). Module 100 may process such signal so that information (data) is transferred via a selected one of the radios 152, 154, 156 to a central collection facility. A particular radio to receive operating power may be selected based on a number of criteria including selection of a radio that is compatible with the system, selection of an alternate radio for use with an adjacent system, selection of a backup radio from two or more otherwise identical radios where one might have failed, or based on other reasons. Such selection is not a specific limitation of the presently disclosed subject matter, however. Input signals from such a consumption measurement device may be accumulated and/or processed by processor 110 and stored in memory 112 for later transmission. Alternatively accumulated and/or processed information may be passed directly to radios 152, 154, 156 via signal pathways 114, 116, 118 for immediate transmission to a remote collection facility. Memory 112 may also be used to store operating instructions for processor 110.

Figure 3:
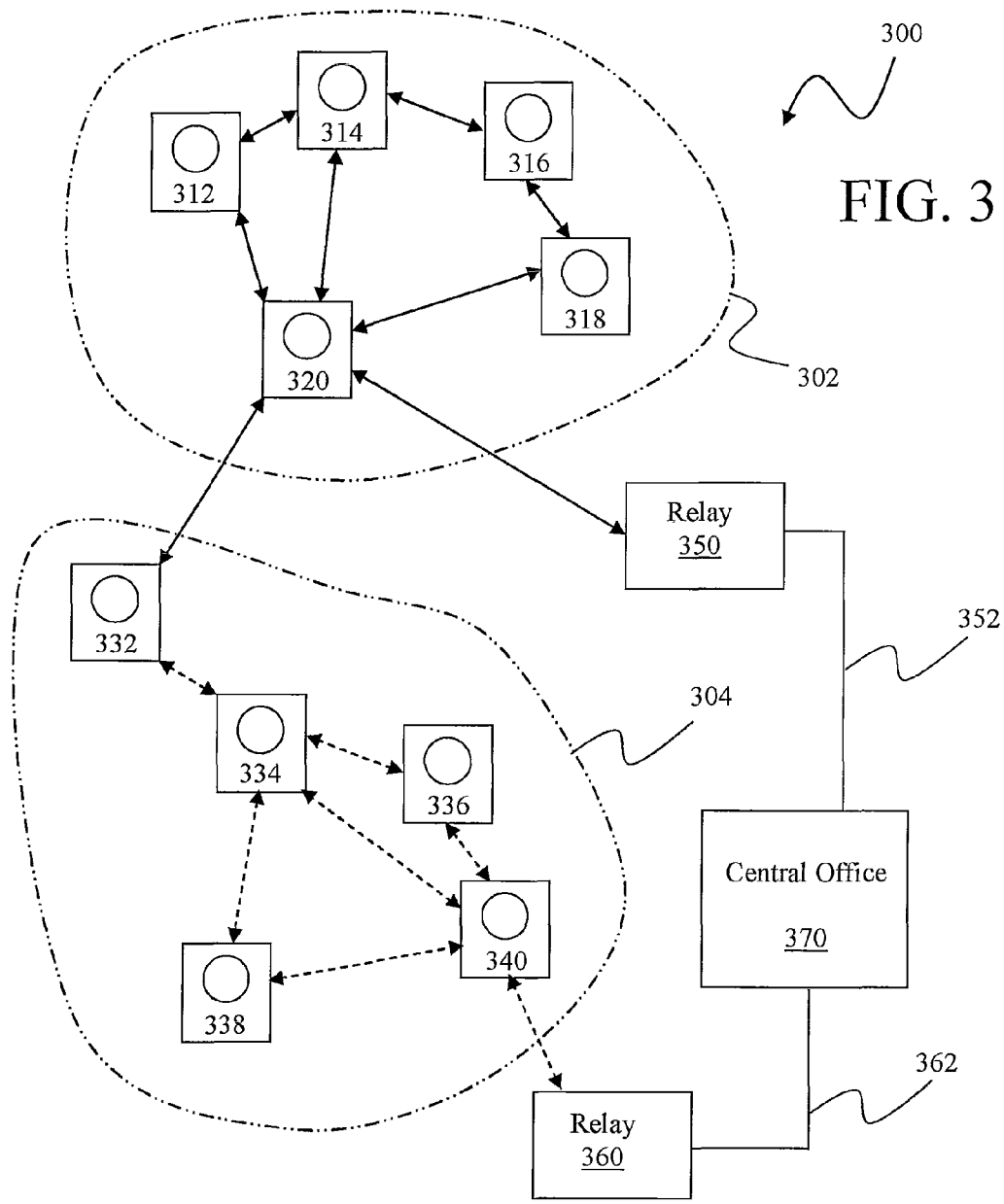
FIG. 3 is a block diagram of an exemplary system in which multi-WAN module enabled devices may operate in accordance with the presently disclosed subject matter.

While the presently disclosed subject matter described with respect to FIG. 1 is for purposes of example only described in relation to a WAN module 100 associated with a measurement device, it should also be appreciated that WAN module 100 may also be associated with equipment at a central collection facility or with other transmission equipment elsewhere in an AMI such as relay devices, as is referenced and explained more fully herein with reference to FIG. 3.

In accordance with presently disclosed subject matter, processor 110 is configured to facilitate desired control of electrical power from power supply 120 to the radios 152, 154, 156 by way of switch 140. As illustrated in FIG. 1, switch 140 corresponds generally to a single pole, multi-position switch that is configured to be controlled over control line 124 from processor 110. Significantly, and for reasons that will be explained more fully later, switch 140 is configured such that power may be applied from power supply 120 through power line 122, switch 140, and lines 142, 144, 146 to only one of the radios 152, 154, 156 at a time.

Those of ordinary skill in the art will appreciate that switch 140, while exemplarily illustrated as an electromechanical switch, may, in fact, correspond to any switch configuration including such illustrated electromechanical switch as well as other switch types. Such switches may include, without limitation, switches presently known or later developed, including solid state switches, and including also integrated circuits or other electronic circuitry that is configured to be controlled electronically by way of processor 110 via control line 124, and which is constructed such that switch 140 is capable of applying electrical power from power supply 120 via connecting lines 122, 142, 144, 146 to only one of radios 152, 154, 156 at a time.

Further with respect to switch 140, in accordance with presently disclosed subject matter, commands may be sent to processor 110 by way of USB interface 130 to instruct switch 140 to select a particular radio 152, 154, 156 to receive operational power from power supply 120. Such instruction may be provided via USB interface 130 at any time, including during initial installation of WAN module 100 or at any time during such module's operation "on the fly."

With further reference to representative, exemplary radios 152, 154, 156, it should be appreciated that each such representative radio 152, 154, 156 may correspond to a different type of radio including, without limitation, cellular telephone radios, WiFi radio, and WiMax radios. Further, any cellular radios employed may correspond to radios operating in various bands including, without limitation, the 700 MHz range, 800 MHz range, and 900 MHz range as well as the 1.8 GHz range or any other operating frequency as may be established by governmental authorities, or as may later be used. Further still, the various radios may be configured to operate on different networks using different modulation technologies as provided by various cellular service suppliers including, but not limited to, AT&T, Sprint, T-Mobile, and Verizon (all trademarks of their respective companies). Of course, it is entirely possible to provide radios configured for operation on a private wide area network operating using any available modulation technique and any authorized operating frequency or bands. Regardless of the type of radios provided, and whether presently known or later devised, such radios are per presently disclosed subject matter configured to wirelessly transmit information.

In certain instances, where it is desired to provide redundancy type backup in a system, the radios may be identical so that one radio is designated as a primary device while a second may be designated as a failover or backup device. Further, in accordance with presently disclosed subject matter, additional radios may be provide to supply yet additional redundancy or to provide opportunity to shift transmission of data to a different network or transmission technology, depending on the identified needs for any particular installation. However, regardless of the transmission frequency, technology, bands employed to transmit information, or number of radios provided in WAN module 100, a significant aspect of the presently disclosed subject matter resides in the fact that only one of the radios is configured to receive operating power from representative power supply 120 at any one time.

Referring further to FIG. 1, it will be noticed that each of the radios 152, 154, 156 is coupled at their outputs 162, 164, 166, respectively, to a single broadband antenna 170 by way of common connection 160. Such common use of a single antenna provides significant savings both in circuit board real estate in instances where antenna 170 may be formed directly on a circuit board holding other components of WAN module 100, and in terms of cost in this and other instances where antenna 170 may be located elsewhere.

Those of ordinary skill in the art will appreciate that measures should be taken to insure that potentially harmful radio frequency (RF) energy coupled to non energized radios is minimized. Such protection measures may take the form of, for example, shielding, directional couplers for the antenna connection, and/or over voltage protection devices installed within the radios. Other alternate protective arrangements may, however, be provided.

Figure 2:
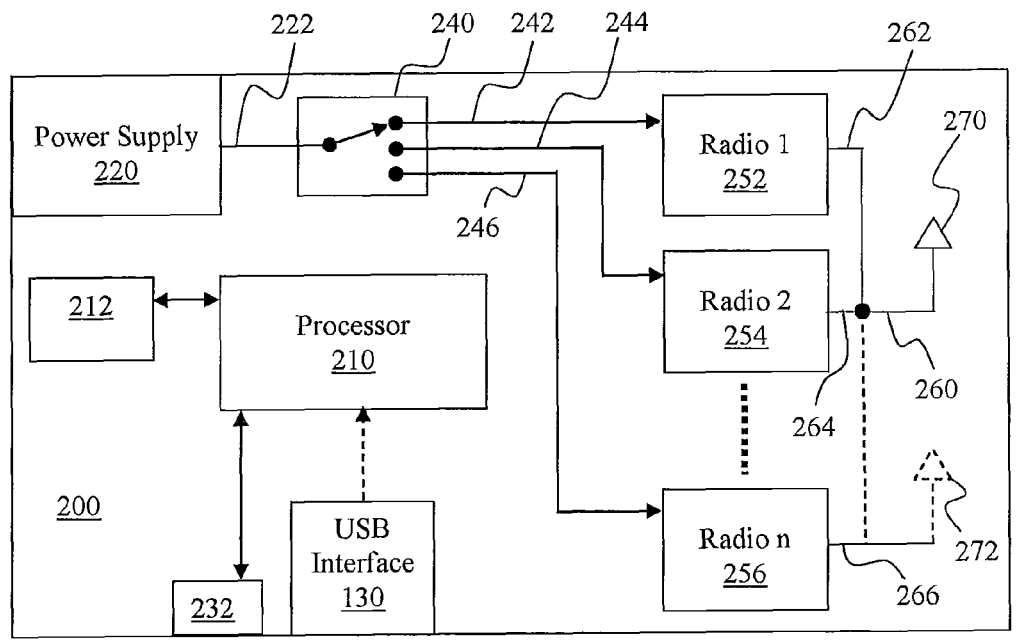
FIG. 2 is a block diagram of a second exemplary embodiment of a WAN module in accordance with presently disclosed subject matter.

With reference now to FIG. 2, there is illustrated a block diagram of a second embodiment of a WAN module generally 200 in accordance with presently disclosed subject matter. WAN module 200 corresponds generally to WAN module 100 illustrated in FIG. 1 with several variations. Firstly, it will be noticed that all elements illustrated in FIG. 2 mirror generally equivalent elements illustrated in FIG. 1 and carry the same reference numbers except for the differing 100 and 200 series numbers. As such, a specific review of such components will not be repeated here because such is unnecessary for a complete understanding by one of ordinary skill in the art but rather the specific differences will be noted.

In general, WAN module 200 corresponds identically to WAN module 100 with two notable exceptions. Firstly, switch 240 illustrated in FIG. 2 is configured as a manually operated switch so that there is no control of switch 240 by way of processor 210 as with the FIG. 1 embodiment. As presently illustrated, switch 240 is shown as a single pole, multiple (for example, three) position switch that, inherently, allows application of electrical power from power supply 220 via power lines 222, 242, 244, 246 to be applied to only one of radios 252, 254, 256 at any one time. Those of ordinary skill in the art should appreciate that other types of manually operated switches may be employed including, for example and without limitation, manually settable jumper connections.

An additional aspect of the exemplary embodiment illustrated in FIG. 2 resides in the possible use of a second antenna 272 in addition to a shared antenna 270 corresponding to the single antenna 170 of the FIG. 1 embodiment. As previously noted with respect to FIG. 1, antenna 170 is designed as a broadband antenna. Antenna 270 is also designed as a broadband antenna but under certain conditions it may be advisable to provide an additional antenna 272 if the operating range for the various radios is too far separated to permit effective signal transmission from all radios sharing a single antenna event though a broadband antenna is utilized.

Other aspects of such exemplary second embodiment of the presently disclosed subject matter illustrated in FIG. 2 as would be understood from the complete disclosure herewith (including information transmission from processor 210 to radios 252, 254, 256 previously illustrated in FIG. 1) are also provided in any installation of such second embodiment but omitted from FIG. 2 for clarity.

With reference to FIG. 3, there is illustrated a block diagram of an exemplary system generally 300 in which multi-WAN module enabled devices may operate. As illustrated, system 300 may correspond to two or more groups of metrology devices here exemplarily illustrated as metrology groups 302 and 304, and where each group 302 and 304 is respectively configured to communicate with a central office 370 by way of respective relay devices 350, 360.

Each metrology group 302, 304 may correspond to a number of separate metrology devices 312, 314, 316, 318, 320, 332, 334, 336, 338, 340, each in this exemplary configuration corresponding to an electricity consumption measuring device, at least some of which include a WAN module 100 or 200 as previously illustrated and discussed.

Further, selected of the metrology devices, for example such as metrology devices 320 and 340, may be configured to operate as relay devices. In such manner, in addition to collecting consumption information themselves from their own local measurement device, information may be collected from other metrology devices, for example metrology devices 312, 314, 316, 318 in metrology group 302 and 332, 334, 336, 338 in metrology group 304, to be passed on via relay devices 350, 360 to central office 370. In the exemplary configuration illustrated in FIG. 3, metrology devices in metrology group 302 may transmit information among the various metrology devices 312, 314, 316, 318, 320 within the group and on to relay 350 using a first transmission methodology on frequencies or bands on which a first radio associated with their installed WAN modules operate. Such transmissions are illustrated by the solid line double arrow head lines illustrating a first bi-directional communication channel. Relay 350 may transmit information to central office 370 by way of cable 352 or, alternatively, by an unillustrated RF channel.

In similar fashion, metrology devices in group 304 may transmit information among the various metrology devices 332, 334, 336, 338, 340 within the group and on to relay 360 using a second transmission methodology on frequencies or bands on which a second radio associated with their installed WAN modules operate. Such transmissions are illustrated by the dashed line double arrow head lines illustrating a second bi-directional communication channel or methodology. Relay 360 may transmit information to central office 370 by way of cable 362 or, alternatively, by an unillustrated RF channel.

In accordance with presently disclosed subject matter, certain of the metrology devices may experience transmission problems communicating with their originally assigned metrology group. Such problems may result from a number of different sources including, but not limited to, ongoing weather condition, changes in terrain including obstacles created because of new building construction, and relocation of particular metrology devices. In such instances, the presently disclosed subject matter provides a mechanism where communications may be reestablished. In an exemplary instance, metrology devices 332 which were originally assigned to metrology group 304 may be switched to metrology group 302 simply by selecting an alternate radio already provided on its WAN module. As those of ordinary skill in the art will appreciate, it is important that both radios not be simultaneously activated in such instance. The presently disclosed subject matter provides assurance that such will be the case.

Figure 4:
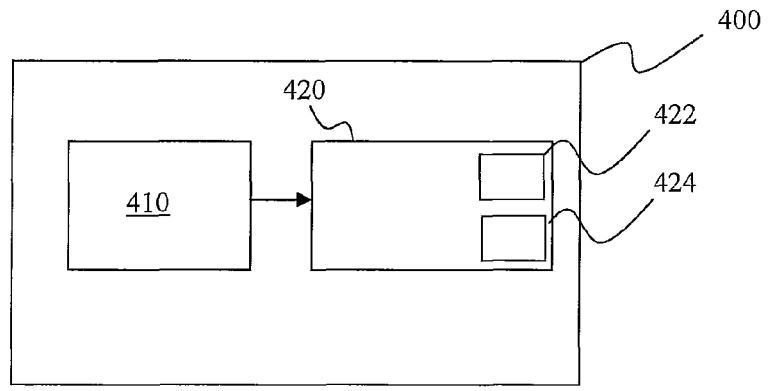
FIG. 4 is a block diagram of an exemplary utility consumption measuring device including a WAN module in accordance with present disclosure.

Referring to FIG. 4, there is illustrated a block diagram of an exemplary utility consumption measuring device generally 400 including WAN module 420 constructed in accordance with the presently disclosed subject matter. As illustrated, utility consumption measuring device 400 may correspond to any of several different types of utility consumption measuring devices including, without limitation, an electricity meter, a gas meter, or a water meter. Generally, utility consumption measuring device 400 includes a utility measuring component 410 that, representatively, may correspond to a residential power meter. Consumption measurements made by measuring device 410 are passed to WAN module 420 for transmission to a central office such as central office 370 illustrated in FIG. 3. As further illustrated in FIG. 4, WAN module 420 is provided with a pair of selectively energized radios 422, 424 as previously described hereinabove.

While the presently disclosed subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the presently disclosed subject matter as would be readily apparent to one of ordinary skill in the art.

What is claimed is:

1. A wide area network (WAN) module, comprising:
at least two radios, each radio configured to wirelessly transmit information;
a power supply;
an electronically controllable switch coupled to the power supply, said switch configured to selectively direct operating power from said power supply to only one of said at least two radios at any one time;
a controller, coupled to the switch, said controller configured to selectively operate said switch; and
a universal serial bus (USB) interface coupled to said controller,
whereby external commands may be sent to said controller by way of said USB interface so as to selectively control said switch.

2. A module as in claim 1, wherein said switch is manually operable.

3. A module as in claim 1, further comprising a broadband antenna, coupled to an output of each of said at least two radios.

4. A module as in claim 3, further comprising a second antenna, selectively coupled to an output of each of said at least two radios.

5. A module as in claim 1, wherein said at least two radios are configured to wirelessly transmit information using different frequency bands.

6. A module as in claim 1, wherein said at least two radios are configured to wirelessly transmit information using different modulation technologies.

7. A module as in claim 1, wherein said at least two radios are identical, a first of said at least two radios is configured as a primary radio, and a second of said at least two radios is configured as a failover radio.

8. A module as in claim 1, further comprising more than two of said radios, with each radio configured to wirelessly transmit information, and with said switch configured to direct operating power from said power supply to a selected one of said more than two radios, whereby only one of said more than two radios may receive operating power at any one time.

9. A utility consumption measuring device, comprising:
a utility consumption measuring component; and
a wide area network (WAN) module including at least two radios, a power supply, and an electronically controllable switch;
a controller coupled to the switch, said controller configured to selectively operate said switch;
a universal serial bus (USB) interface coupled to said controller,
wherein said switch is configured to selectively direct operating power from said power supply to only one of said at least two radios at any one time, and
said utility consumption measuring component is configured to transmit consumption information to said controller for transmission by one of said at least two radios, and
whereby external commands may be sent to said controller by way of said USB interface to control said switch.

10. A device as in claim 9, wherein said switch is manually operable.

11. A system for transmitting utility consumption information to a central office, comprising:
a plurality of utility consumption measuring devices, each utility consumption measuring device including a utility consumption measuring component and a wide area network (WAN) module; and
a processor and a universal serial bus (USB) interface in selected of said WAN modules,
wherein said WAN module in selected of said plurality of utility consumption measuring devices includes at least two radios, an associated power supply, and an associated switch,
said switches are configured to direct operating power from said respectively associated power supply to only one of said at least two radios at any one time, and
said processor is configured to receive signals from said USB interface and to control an associated switch of an associated WAN module based on said signals from said USB interface.

12. A system as in claim 11, wherein selected of said switches are manually operable.

13. A method in a utility consumption measuring device, comprising:
measuring utility consumption data;
controlling an electronically controllable switch via Universal Serial Bus (USB) interface by a controller of the utility consumption measuring device to selectively direct operating power from a power supply of said utility consumption measuring device to a selected one of at least two radios of a wide area network module of said utility consumption measuring device, such that the switch supplies operating power to only one of said at least two radios at any one time; and
transmitting utility consumption information to a central office via the selected one of the at least two radios.

14. The method of claim 13, further comprising receiving commands from a source external to the utility consumption measuring device, wherein the controlling of the switch is performed based at least in part on the commands received from the source external to the utility consumption measuring device.

15. The method of claim 13, further comprising receiving commands via a manual interface, wherein the controlling of the switch is performed based at least in part on the commands received from the manual interface.

16. The method of claim 13, wherein transmitting utility consumption information to a central office via the selected one of the at least two radios comprises:

selecting a frequency band and/or modulation to use to transmit the utility consumption information to the central office; and wirelessly transmitting information the utility consumption information to the central office using the selected frequency band and/or modulation.

* * * * *